(12) United States Patent
Ishida et al.

(10) Patent No.: US 9,135,945 B2
(45) Date of Patent: Sep. 15, 2015

(54) DISK ROTATING MOTOR COMPRISING BRACKET INCLUDING CYLINDRICAL PORTION AND FOLDED PORTION

(71) Applicant: Minebea Co., Ltd., Kitasaku-gun, Nagano (JP)

(72) Inventors: Tsuyoshi Ishida, Yonago (JP); Okihisa Tsuchie, Yonago (JP); Toshiyuki Nishikata, Yonago (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 0 days.

(21) Appl. No.: 14/199,797

(22) Filed: Mar. 6, 2014

(65) Prior Publication Data

US 2014/0185423 A1    Jul. 3, 2014

Related U.S. Application Data

(63) Continuation of application No. 13/647,755, filed on Oct. 9, 2012, now Pat. No. 8,737,015.

(30) Foreign Application Priority Data

Oct. 19, 2011   (JP) ................................. 2011-229486

(51) Int. Cl.
*G11B 17/02* (2006.01)
*G11B 19/20* (2006.01)
(Continued)

(52) U.S. Cl.
CPC ........ *G11B 19/2009* (2013.01); *G11B 19/2036* (2013.01); *H02K 5/16* (2013.01); *H02K 15/14* (2013.01)

(58) Field of Classification Search
CPC ...... G11B 17/02; G11B 17/028; G11B 19/20; G11B 19/2009; G11B 19/2036; G11B 19/2045; H02K 5/16; H02K 5/1672; H02K 5/1675; H02K 15/14
USPC ..................... 360/98.07, 99.08; 310/67 R, 90
See application file for complete search history.

(56) References Cited

U.S. PATENT DOCUMENTS 6,373,655 B1   4/2002   MacLeod et al.
8,223,455 B2   7/2012   Iguchi et al.
(Continued)

FOREIGN PATENT DOCUMENTS

JP    A-09-009566    1/1997
JP    A-2000-069735  3/2000
(Continued)

OTHER PUBLICATIONS

Dec. 16, 2014 Office Action issued in Japanese Patent Application No. 2011-229486.

(Continued)

*Primary Examiner* — Jefferson Evans
(74) *Attorney, Agent, or Firm* — Oliff PLC (57) ABSTRACT

A disk rotating motor is provided with: a stator including a stator core and a bracket for fixing the stator core; a rotor that can be rotated with respect to the stator and includes a rotary shaft; and a bearing that rotatably supports the rotary shaft on the outer diameter side of the rotary shaft, the bearing being supported by the bracket. The bracket includes a cylindrical portion extending along the rotary shaft, and a folded portion formed by folding the upper end of the cylindrical portion onto the outer diameter side such that at least a coaxial part of the folded portion extends coaxially along an outer surface of the cylindrical portion. The cylindrical portion and the folded portion are sandwiched by the stator core and the bearing in a radial direction.

7 Claims, 11 Drawing Sheets

(51) Int. Cl.
  *H02K 5/16* (2006.01)
  *H02K 15/14* (2006.01)

(56) References Cited

U.S. PATENT DOCUMENTS

| | | | |
|---|---|---|---|
| 8,243,384 | B2 | 8/2012 | Nishio et al. |
| 8,358,483 | B2 | 1/2013 | Sekii et al. |
| 2001/0007519 | A1 | 7/2001 | Nishio et al. |
| 2009/0141395 | A1* | 6/2009 | Nagata .................. 360/99.08 |
| 2010/0045129 | A1 | 2/2010 | Song |
| 2011/0158080 | A1 | 6/2011 | Yoon |
| 2011/0163621 | A1 | 7/2011 | Kim |
| 2012/0248914 | A1 | 10/2012 | Yoo et al. |
| 2012/0299451 | A1 | 11/2012 | Choi |

FOREIGN PATENT DOCUMENTS

| | | |
|---|---|---|
| JP | A-2000-125505 | 4/2000 |
| JP | A-2001-054249 | 2/2001 |
| JP | A-2001-314058 | 11/2001 |
| JP | A-2002-112502 | 4/2002 |
| JP | A-2002-112517 | 4/2002 |
| JP | A-2002-262540 | 9/2002 |
| JP | A-2003-079095 | 3/2003 |
| JP | A-2004-007905 | 1/2004 |
| JP | 2006-014475 A | 1/2006 |
| JP | A-2006-050738 | 2/2006 |
| JP | A-2006-149052 | 6/2006 |
| JP | A-2008-283759 | 11/2008 |
| JP | 2009-118625 A | 5/2009 |
| JP | 2010-166632 A | 7/2010 |

OTHER PUBLICATIONS

May 12, 2015 Office Action in Japanese Patent Application No. 2011-229486.

* cited by examiner

DISK ROTATING MOTOR COMPRISING BRACKET INCLUDING CYLINDRICAL PORTION AND FOLDED PORTION

This is a continuation of U.S. application Ser. No. 13/647,755 filed Oct. 9, 2012, which claims priority to Japanese Patent Application No. 2011-229486 filed with the Japan Patent Office on Oct. 19, 2011. The disclosure of the prior application is hereby incorporated by reference herein in its entirety.

BACKGROUND OF THE INVENTION

1. Field of the Invention

The present invention relates to a disk rotating motor and a disk drive device provided with the same and, more particularly, to a disk rotating motor that can be fabricated in a simple method and a disk drive device provided with the same.

2. Description of the Related Art

When information is written in or read from a recording medium having information recorded therein such as an optical disk or a magneto-optical disk, a disk drive device is used to rotate a disk. The disk drive device includes a disk rotating motor for rotating the disk. The techniques relevant to the disk rotating motor in the prior art are disclosed in, for example, Documents 1 and 2.

Document 1 discloses a brushless motor including a burring unit constituting a bearing housing and a fixing base unit for fixing the motor, the units being formed integrally with each other.

Document 2 discloses a spindle motor including a bracket having an annular recess and a cylindrical opening, the bracket being integrally molded by pressing. The annular recess is formed in an axial direction, and contains a stator and a rotor magnet therein. A shaft is fitted to the inner circumference of the cylindrical opening.

Document 1: Japanese Patent Laying-Open No. 2002-262540
Document 2: Japanese Patent Laying-Open No. 2001-314058

Cost reduction has been strongly required for the disk rotating motor in recent years. In order to reduce the cost of the disk rotating motor, the disk rotating motor needs be fabricated in a simple method. For example, the number of component parts for the disk rotating motor is reduced; or not a relatively complicated (i.e., expensive) processing method such as cutting but a relatively simple (i.e., inexpensive) method such as pressing needs be used to process component parts constituting the disk rotating motor. Moreover, not a complicated tightening method but a relatively easy (i.e., inexpensive) tightening method typified by press-fitting need be adopted with high assembling precision in assembling the component parts. The prior art has been susceptible to improvement from the viewpoint of simplification of the fabricating method.

SUMMARY OF THE INVENTION

The present invention has been accomplished to solve the above-described problems to be solved. Therefore, an object of the present invention is to provide a disk rotating motor that can be fabricated by a simple method and a disk drive device provided with the same.

A disk rotating motor according to one aspect of the present invention is provided with: a stator including a stator core and a bracket for fixing the stator core; a rotor that can be rotated with respect to the stator and includes a rotary shaft; and a bearing that rotatably supports the rotary shaft on the outer diameter side of the rotary shaft, the bearing being supported by the bracket; the bracket including a cylindrical portion extending along the rotary shaft and a folded portion formed by folding the end of the cylindrical portion onto the outer diameter side such that at least a coaxial part of the folded portion extends coaxially along an outer surface of the cylindrical portion, and the cylindrical portion and the folded portion being sandwiched by the stator core and the bearing in a radial direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments according to the present invention will be described with reference to the attached drawings.

In the following description, "an outer diameter side" signifies an outer diameter side when the rotary shaft of a disk rotating motor is referred to as the center whereas "an inner diameter side" signifies an inner diameter side when the rotary shaft of the disk rotating motor is referred to as the center. Moreover, "an outer peripheral surface" signifies an outer peripheral surface when the rotary shaft of the disk rotating motor is referred to as the center whereas "an inner circumferential surface" signifies an inner circumferential surface when the rotary shaft of the disk rotating motor is referred to as the center.

[First Embodiment]

Figure 1:
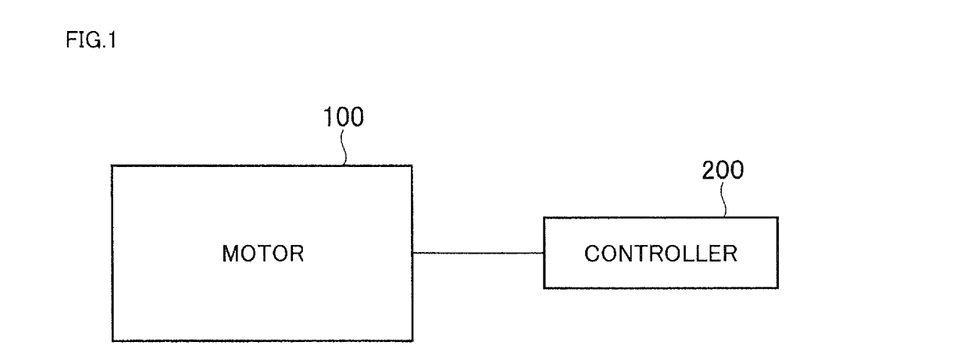
FIG. 1 is a block diagram illustrating the configuration of a disk drive device in an embodiment according to the present invention.

Referring to FIG. 1, a disk drive device in the present embodiment is provided with a motor 100 serving as a disk rotating motor and a controller 200 for controlling the drive state of motor 100 such as ON/OFF or a rotational speed.

Figure 2:
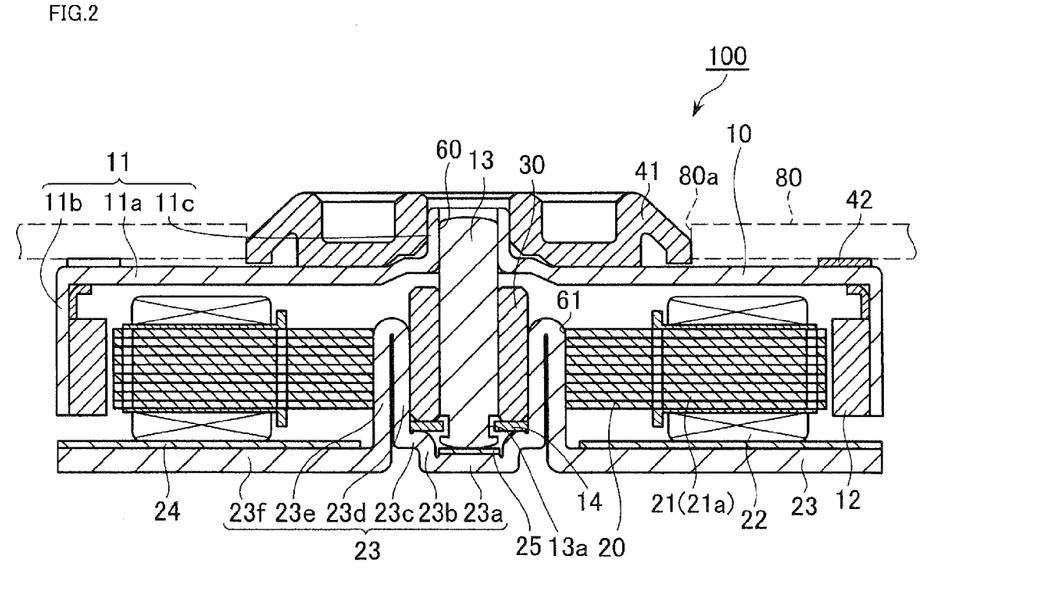
FIG. 2 is a cross-sectional view schematically showing the configuration of a disk rotating motor in the embodiment according to the present invention.
Figure 3:
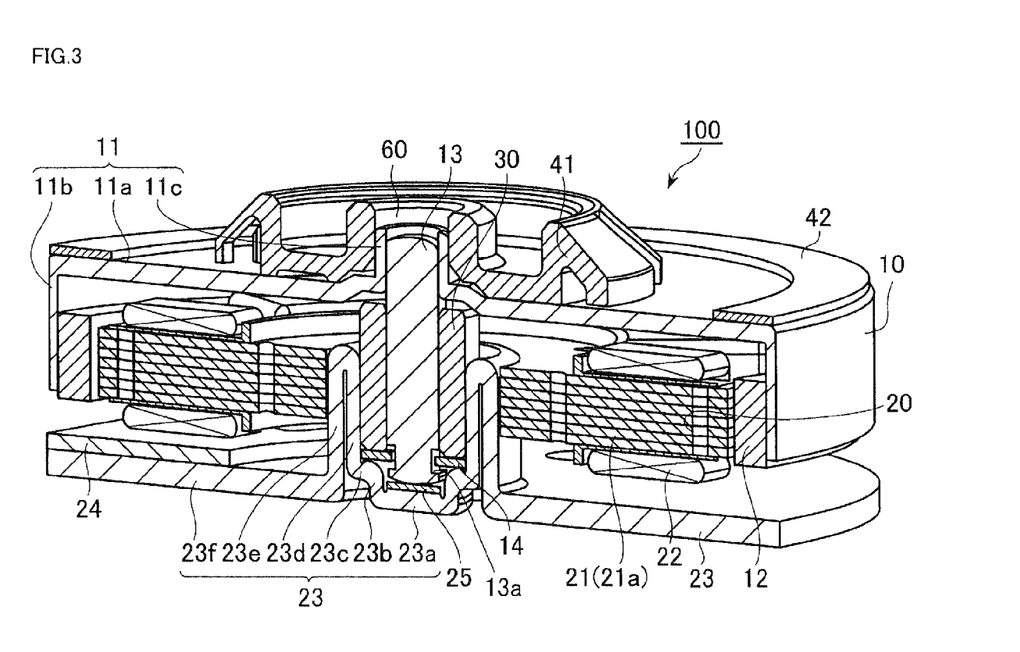
FIG. 3 is a cross-sectional perspective view schematically showing the configuration of the disk rotating motor in the embodiment according to the present invention.

FIGS. 2 and 3 are views schematically showing the configuration of the disk rotating motor in the embodiment according to the present invention, wherein FIGS. 2 and 3 are a cross-sectional view and a cross-sectional perspective view, respectively.

Referring to FIGS. 2 and 3, motor 100 includes mainly a rotor 10, a stator 20, and a bearing 30. Rotor 10 can be rotated with respect to stator 20. Bearing 30 rotatably supports rotor 10 with respect to stator 20.

Rotor 10 includes a rotor frame 11, a magnet 12, a shaft 13, and a stopper washer 14. Rotor frame 11 is adapted to prevent a magnetic field from leaking from the inside of rotor frame 11, and is typified by a magnetic member. Rotor frame 11 includes a turn table 11a and a side wall 11b. Turn table 11a extends in, for example, a direction perpendicular to the extension direction of shaft 13 (laterally in FIG. 2) (hereinafter often referred to as an axial direction). Turn table 11a is formed into a circular shape, as viewed on a plane. A hole 60 is formed at the center of turn table 11a so as to allow shaft 13 to pass therethrough. Rotor frame 11 is fixed to shaft 13 at hole 60. Side wall 11b extends toward a bracket 23 in stator 20 from an end on an outer diameter side of turn table 11a (downward in FIG. 2). Side wall 11b is formed into a cylindrical shape.

Magnet 12 is fixed to the inner circumferential surface of side wall 11b. Magnet 12 is formed into an annular shape, and includes regions magnetized to an N pole and regions magnetized to an S pole alternately at constant intervals in a circumferential direction. Magnet 12 is fixed to rotor frame 11 in such a manner as to face stator 20.

Shaft 13 extends in a vertical direction in FIG. 2 in such a manner as to pass through the center of rotor frame 11 (i.e., the center in FIG. 2). Rotor frame 11 can be rotated on shaft 13 together with shaft 13. Shaft 13 is rotatably supported by bearing 30 arranged around shaft 13 on the outer diameter side.

Stopper washer 14 is fitted to a groove 13a formed at shaft 13 near the lower end of shaft 13 in FIG. 2. When shaft 13 is moved upward in FIG. 2, stopper washer 14 is brought into contact with bearing 30, thereby preventing shaft 13 from falling off upward in FIG. 2. Stopper washer 14 is positionally restricted between bearing 30 and a third bottom 23c.

Stator 20 includes a stator core 21 (i.e., a core), a stator coil 22, bracket 23, a bottom plate 24, and a thrust plate 25. Stator core 21 is fixed to bracket 23. Stator core 21 includes a plurality of teeth 21a radially extending from its inner diameter side toward its outer diameter side. Stator coil 22 is wound around each of teeth 21a. Bracket 23 is adapted to fix stator core 21. Bottom plate 24 is made of, for example, a magnetic material, and is fixed onto a rotor 10 side in bracket 23.

Figure 4:
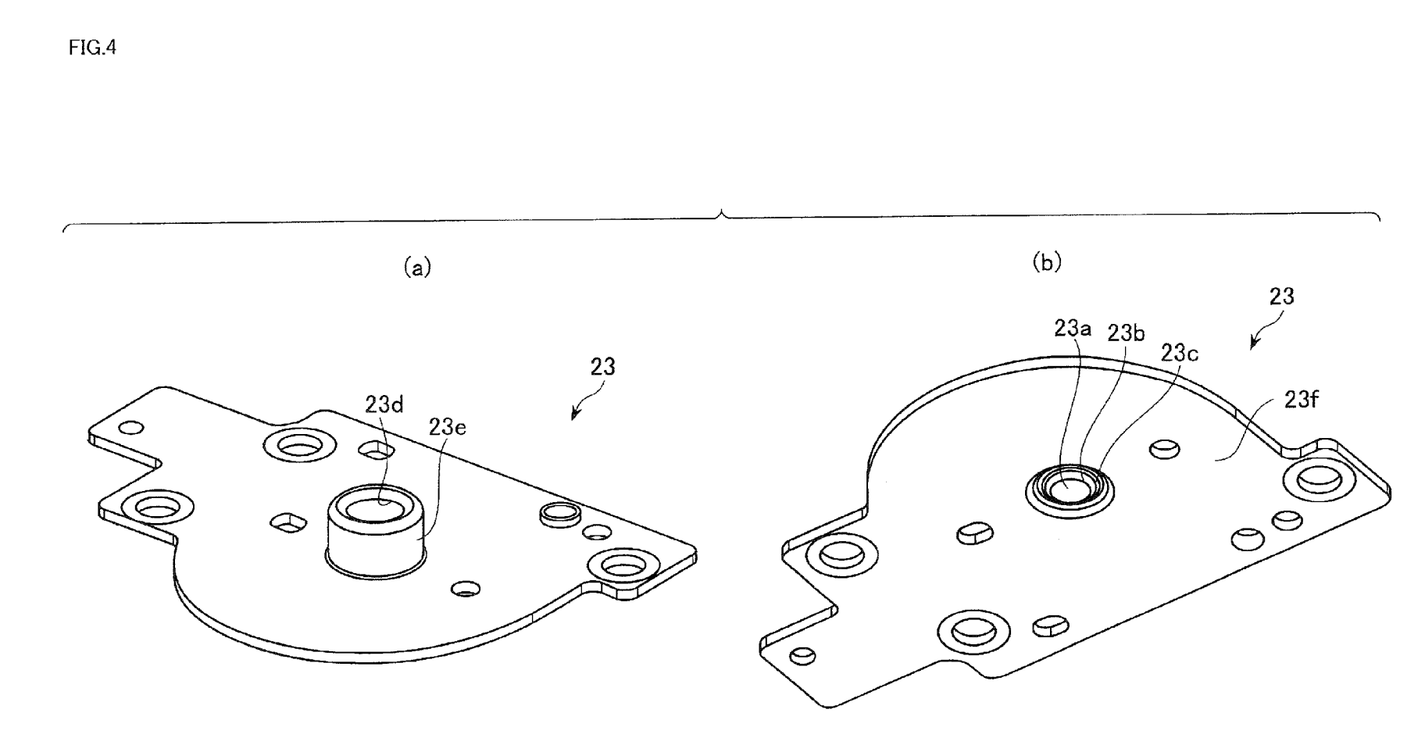
FIG. 4 is a perspective view showing the configuration of a bracket 23.

FIG. 4 is a perspective view showing the configuration of bracket 21 FIG. 4(a) viewed from rotor 10 whereas FIG. 4(b) is viewed oppositely to rotor 10.

Referring to FIGS. 2 to 4, bracket 23 includes a first bottom 23a, a second bottom 23b, third bottom 23c, a cylindrical portion 23d, a folded portion 23e (i.e., bracket folded portion), and an outer edge 23f. Cylindrical portion 23d extends in an axial direction. First to third bottoms 23a to 23c are formed by bending the lower end of cylindrical portion 23d in FIG. 2 toward the inner diameter side, thereby supporting the lower end of shaft 13 in FIG. 2. First bottom 23a is located nearest the lower end of shaft 13 in FIG. 2 in bracket 23, and extends in a lateral direction in FIG. 2. Second bottom 23b extends in the axial direction between the outer-diameter end of first bottom 23a and the inner-diameter end of third bottom 23c. Third bottom 23c extends in the lateral direction in FIG. 2 between the lower end of cylindrical portion 23d and the upper end of second bottom 23b. Folded portion 23e is formed by folding the upper end of cylindrical portion 23d in FIG. 2 toward the outer diameter side. Folded portion 23e extends downward of the boundary with cylindrical portion 23d in FIG. 2. Outer edge 23f extends from the outer-diameter end of folded portion 23e outward of the outer-diameter end of stator core 21. Cylindrical portion 23d defines a bearing container. Folded portion 23e serves as a core fixing portion.

Bearing 30 is fixed at the inner circumferential surface of cylindrical portion 23d. Bearing 30 is formed into a cylindrical shape, and extends along shaft 13. The outer peripheral surface of bearing 30 is brought into contact with the inner circumferential surface of cylindrical portion 23d.

Stator core 21 is fixed at the outer peripheral surface of folded portion 23e. Stator core 21 has a bore 61 formed at the inner-diameter end thereof. The inner circumferential surface of bore 61 is brought into contact with the outer peripheral surface of folded portion 23e.

Thrust plate 25 is formed into, for example, a circular shape, and has a contact surface in contact with the lower end of shaft 13 in FIG. 2. Thrust plate 25 receives a thrust load of shaft 13. First bottom 23a is brought into contact with thrust plate 25 on a side opposite to the contact surface of thrust plate 25 with shaft 13. Second bottom 23b surrounds the outer periphery of thrust plate 25.

Motor 100 further includes a centering member 41 and a cushion rubber 42. Turn table 11a has an inner-diameter end 11c bent upward in FIG. 2. Centering member 41 is fixed at the outer peripheral surface of inner-diameter end 11c. A spring, not shown, is interposed between centering member 41 and inner-diameter end 11c, to thus bias centering member 41 towards the outer-diameter direction. Cushion rubber 42 is disposed at the upper surface of turn table 11a in FIG. 2. When a disk 80 is mounted on the disk drive device, disk 80 is mounted on cushion rubber 42 in such a manner that an opening 80a formed at the center thereof is fitted to centering member 41. Centering member 41 presses the inner circumferential surface of opening 80a of disk 80 by the effect of the spring, thereby fixing disk 80. Cushion rubber 42 is adapted to suppress the vertical vibration of disk 80 in FIG. 2.

Next, a description will be given of one example of a fabricating method for the disk rotating motor in the present embodiment with reference to FIGS. 5 and 6.

Figure 5:
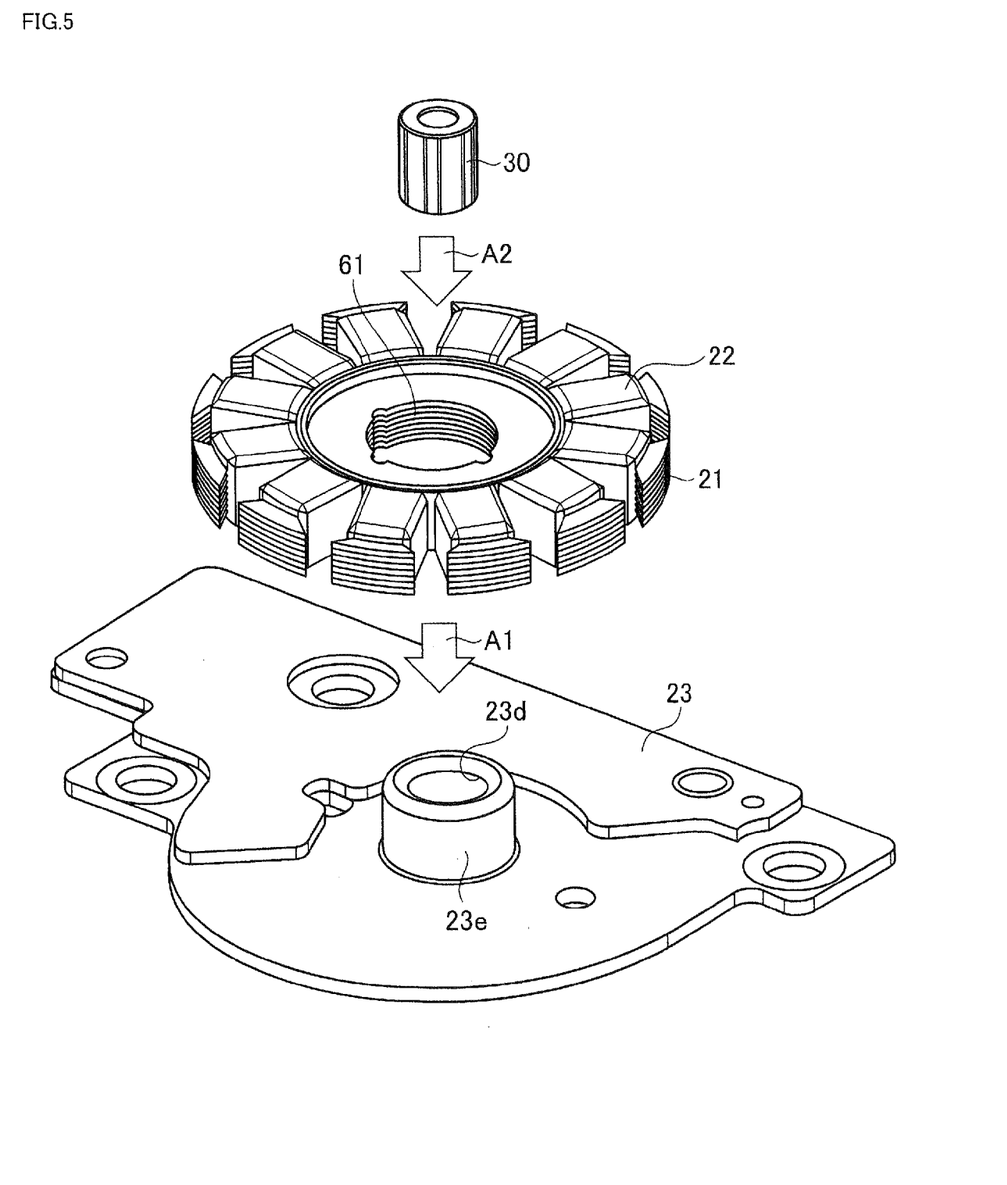
FIGS. 5 and 6 are schematic views illustrating a fabricating method for the disk rotating motor in a first embodiment according to the present invention.

Referring to FIG. 5, first of all, one metallic plate, for example, is plastically machined by pressing or the like, thereby fabricating bracket 23. Subsequently, as indicated by an arrow A1, folded portion 23e is fitted into bore 61 of stator core 21, so that stator core 21 is securely press-fitted to bracket 23.

Figure 6:
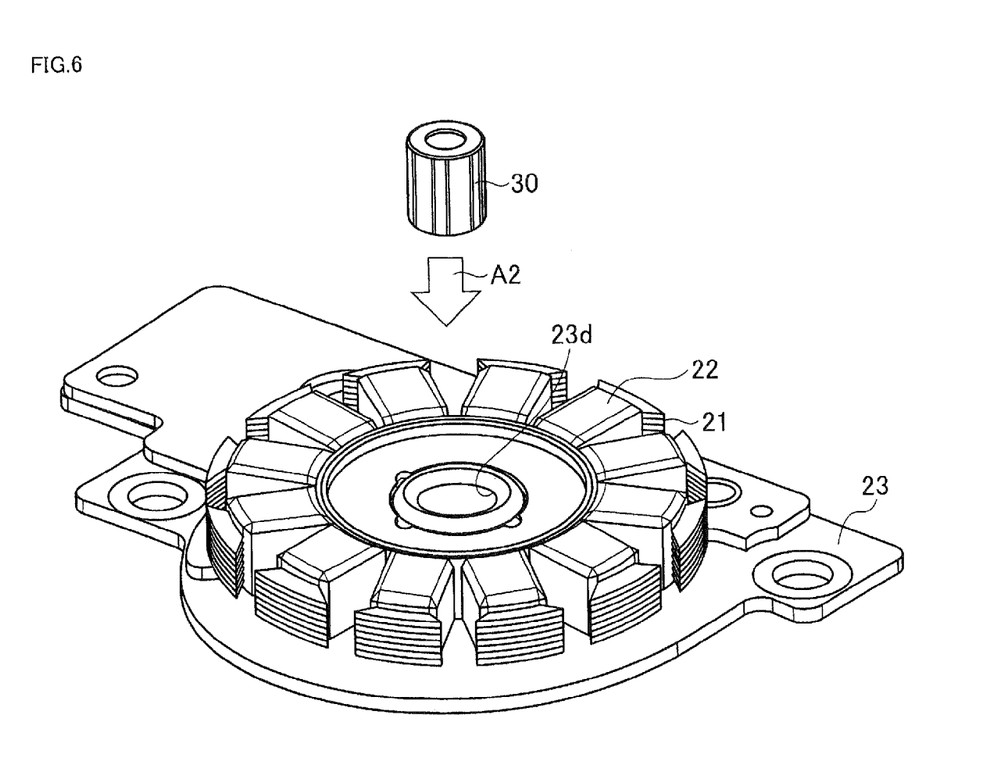

Referring to FIG. 6, as indicated by an arrow A2, bearing 30 is then fitted to cylindrical portion 23d of bracket 23, to be thus securely press-fitted to bracket 23.

Returning to FIG. 2, a suction magnet 44 (FIG. 7) is disposed at a predetermined position, as required. Then, shaft 13 is inserted into bearing 30, so that rotor 10 is disposed in stator 20. Thereafter, centering member 41 and cushion rubber 42 are mounted on rotor frame 11, thus completing motor 100.

The present embodiment can provide the disk rotating motor that can be fabricated in a simple method and a disk drive device provided with the same.

In the present embodiment, bracket 23 including cylindrical portion 23d for fixing bearing 30 and folded portion 23e for fixing the stator core is fabricated by bending one plate, thus reducing the number of component parts and reducing the number of assembling processes. As a consequence, it is possible to fabricate motor 100 in a simple method, so as to reduce the cost of the motor.

Moreover, first to third bottoms 23a to 23c supporting the lower end of shaft 13 in FIG. 2 are fabricated by bending one plate together with cylindrical portion 23d and folded portion 23e, thus reducing the number of component parts and reducing the number of assembling processes. As a consequence, it is possible to fabricate motor 100 in a simple method, so as to reduce the cost of the motor.

Additionally, bracket 23 includes first bottom 23a in contact with thrust plate 25 and second bottom 23b that is formed by bending first bottom 23a and surrounds the outer periphery of thrust plate 25, thus restricting the position of thrust plate 25.

[Second Embodiment]

Figure 7:
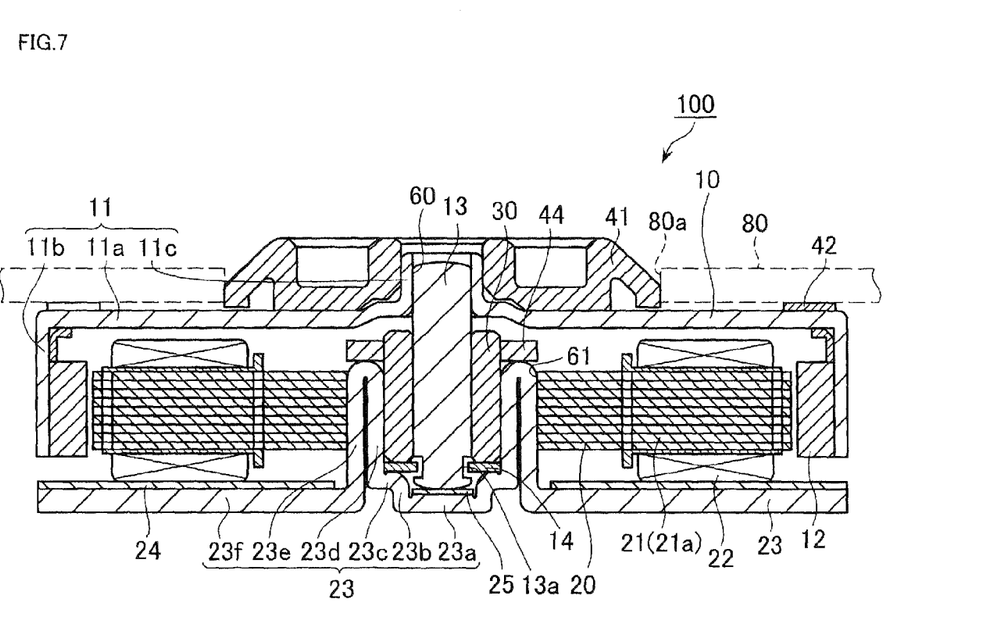
FIG. 7 is a cross-sectional view schematically showing the configuration of a disk rotating motor in a second embodiment according to the present invention.
Figure 8:
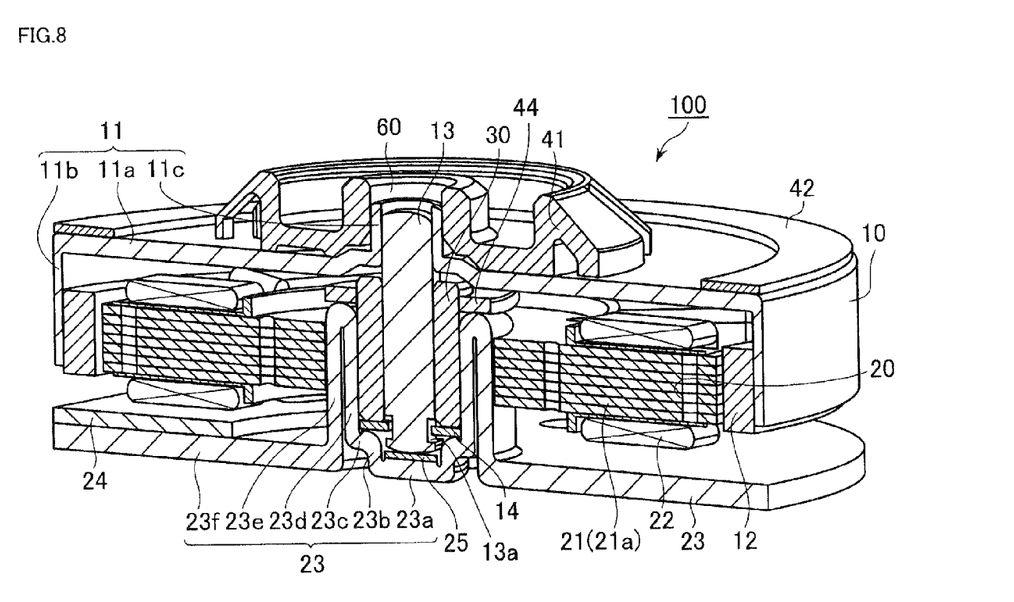
FIG. 8 is a cross-sectional perspective view schematically showing the configuration of the disk rotating motor in the second embodiment according to the present invention.

FIGS. 7 and 8 are views schematically showing the configuration of a disk rotating motor in a second embodiment according to the present invention, wherein FIG. 7 is a cross-sectional view whereas FIG. 8 is a cross-sectional perspective view.

Referring to FIGS. 7 and 8, the present embodiment is different from the first embodiment in that a motor 100 further includes a suction magnet 44. Suction magnet 44 fulfills the function of magnetically sucking a rotor 10 (herein a rotor frame 11) so as to stabilize the axial position of rotor 10. Suction magnet 44 is fitted to the outer peripheral surface of a bearing 30 on the boundary (i.e., at a folding position) between a cylindrical portion 23d and a folded portion 23e. Suction magnet 44 is fixed to the outer peripheral surface of bearing 30 in such a manner as to be brought into contact with the boundary between cylindrical portion 23d and folded portion 23e.

Incidentally, the configuration of motor 100 except the above-described matter is identical to that of the motor in the first embodiment, and therefore, its description is not repeated here.

In the present embodiment, the position of suction magnet 44 can be restricted on the boundary between cylindrical portion 23d and folded portion 23e. As a consequence, suction magnet 44 can suck rotor 10 by uniform suction force.

[Third Embodiment]

Figure 9:
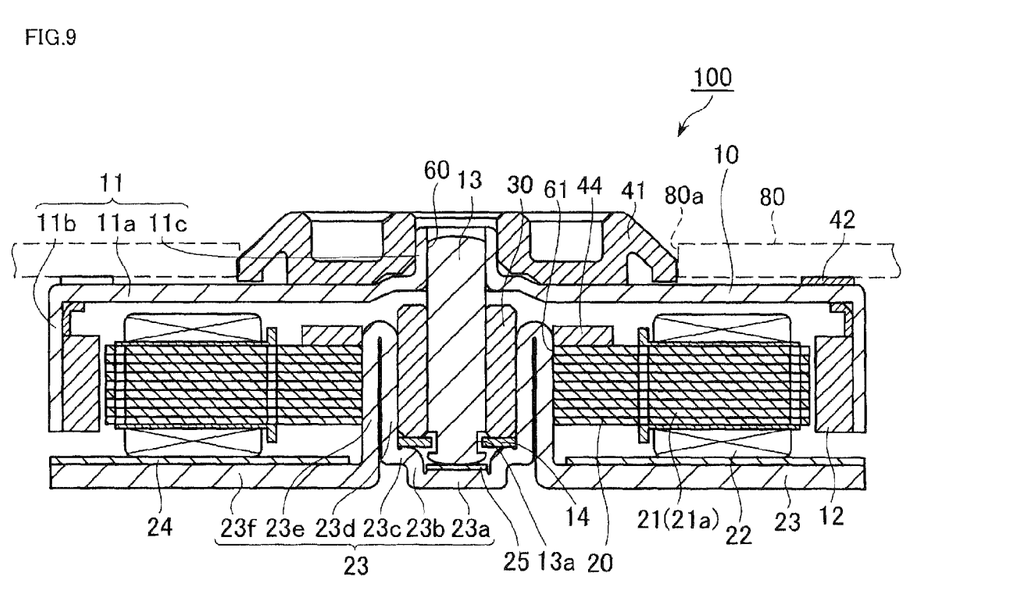
FIG. 9 is a cross-sectional view schematically showing the configuration of a disk rotating motor in a third embodiment according to the present invention.
Figure 10:
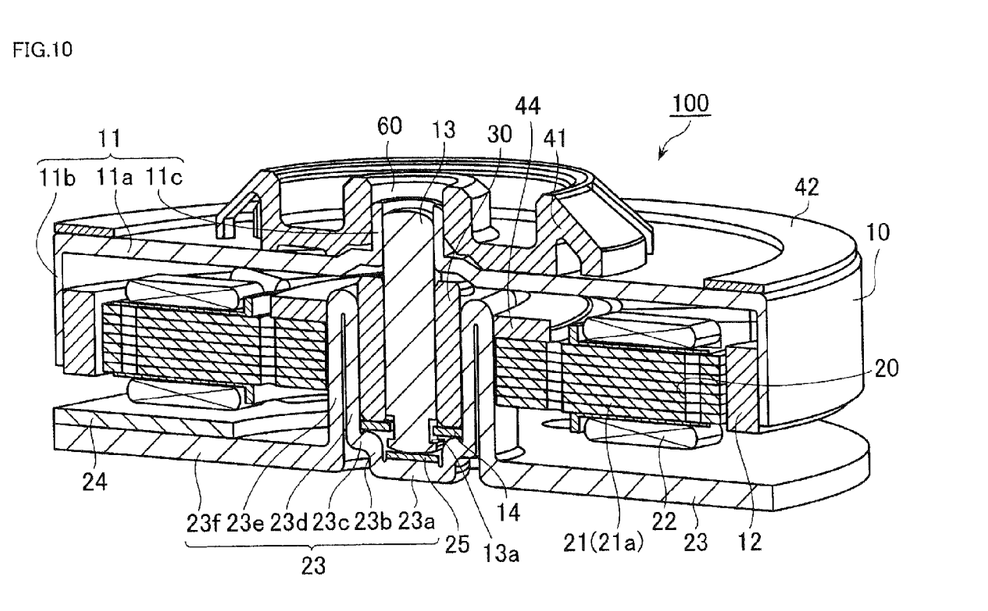
FIG. 10 is a cross-sectional perspective view schematically showing the configuration of the disk rotating motor in the third embodiment according to the present invention.

FIGS. 9 and 10 are views schematically showing the configuration of a disk rotating motor in a third embodiment according to the present invention, wherein FIG. 9 is a cross-sectional view whereas FIG. 10 is a cross-sectional perspective view. Here, FIG. 9 shows the configuration of only a part of the disk rotating motor.

Referring to FIGS. 9 and 10, the present embodiment is different from the second embodiment in the position of a suction magnet 44. Suction magnet 44 is fitted to the outer peripheral surface of a folded portion 23e on a stator core 21. Suction magnet 44 is fixed to the outer peripheral surface of folded portion 23e in such a manner as to be brought into contact with stator core 21.

Incidentally, the configuration of a motor 100 except the above-described matter is identical to that of the motor in the second embodiment, and therefore, its description is not repeated here.

In the present embodiment, the position of suction magnet 44 can be restricted by stator core 21. As a consequence, suction magnet 44 can suck rotor 10 by uniform suction force.

[Fourth Embodiment]

Figure 11:
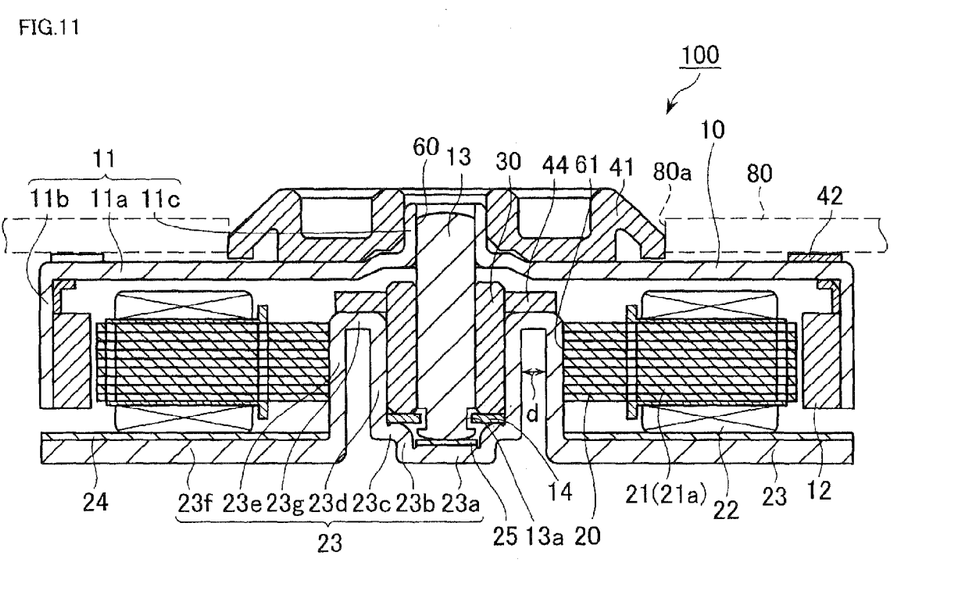
FIG. 11 is a cross-sectional view schematically showing the configuration of a disk rotating motor in a fourth embodiment according to the present invention.

FIG. 11 is a cross-sectional view schematically showing the configuration of a disk rotating motor in a fourth embodiment according to the present invention.

Referring to FIG. 11, the present embodiment is different from the second embodiment in that a bracket 23 further includes a separating portion 23g on the boundary between a cylindrical portion 23d and a folded portion 23e. Separating portion 23g extends in a radial direction from the upper end of cylindrical portion 23d in FIG. 11 toward the upper end of folded portion 23e in FIG. 11. Separating portion 23g is adapted to separate cylindrical portion 23d and folded portion 23e from each other, thereby providing a clearance d therebetween.

Incidentally, the configuration of a motor 100 except the above-described matter is identical to that of the motor in the second embodiment, and therefore, its description is not repeated here.

In the present embodiment, the radial length of separating portion 23g can adjust the radial position of folded portion 23e. As a consequence, stator cores 21 having various sizes can be disposed in bracket 23.

[Others]

The disk rotating motor according to the present invention may be exemplified by an axially fixed motor, a planar opposite motor, and the like in addition to the above-described axially rotational motor.

The above-described embodiments may be appropriately combined with each other. In the case where bracket 23 includes separating portion 23g in combination of the configuration shown in FIG. 9 with the configuration shown in FIG. 11, suction magnet 44 may be fitted to the outer peripheral surface of folded portion 23e on stator core 21.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A disk rotating motor comprising:
a stator including a stator core and a bracket for fixing said stator core;
a rotor that can be rotated with respect to said stator and includes a rotary shaft; and
a bearing that rotatably supports said rotary shaft on the outer diameter side of said rotary shaft,
said bracket including a cylindrical portion extending along said rotary shaft, a folded portion formed by folding the end of said cylindrical portion onto the outer diameter side such that at least a coaxial part of the folded portion extends coaxially along an outer surface of the cylindrical portion, and a bottom formed by bending the end of said cylindrical portion onto an inner diameter side, said bottom supporting one end of said rotary shaft, wherein the bearing is supported and housed by direct contact with an inner cylindrical surface of the cylindrical portion and
said cylindrical portion and said folded portion being sandwiched by said stator core and said bearing in a radial direction.

2. The disk rotating motor according to claim 1, further comprising
a thrust plate having a contact surface that is brought into contact with one end of said rotary shaft,
wherein said bottom includes a first bottom in contact with said thrust plate at a surface opposite to said contact surface and a second bottom that is formed by bending said first bottom and surrounds the outer periphery of said thrust plate.

3. A disk rotating motor comprising:

a stator including a stator core and a bracket for fixing said stator core;

a rotor that can be rotated with respect to said stator and includes a rotary shaft;

a bearing that rotatably supports said rotary shaft on the outer diameter side of said rotary shaft, the bearing being directly supported by said bracket, said bracket including a cylindrical portion extending along said rotary shaft, and a folded portion formed by folding the end of said cylindrical portion onto the outer diameter side such that at least a coaxial part of the folded portion extends coaxially along an outer surface of the cylindrical portion, said cylindrical portion and said folded portion being sandwiched by said stator core and said bearing in a radial direction; and a suction magnet that magnetically sucks said rotor.

4. The disk rotating motor according to claim 3, wherein said suction magnet is fixed at the outer peripheral surface of said bearing in such a manner as to be brought into contact with the boundary between said cylindrical portion and said folded portion.

5. The disk rotating motor according to claim 3, wherein said suction magnet is fixed at the outer peripheral surface of said folded portion in such a manner as to be brought into contact with said stator core.

6. A disk rotating motor comprising:

a stator including a stator core and a bracket for fixing said stator core;

a rotor that can be rotated with respect to said stator and includes a rotary shaft; and a bearing that rotatably supports said rotary shaft on the outer diameter side of said rotary shaft, said bracket including a cylindrical portion extending along said rotary shaft, a folded portion formed by folding the end of said cylindrical portion onto the outer diameter side such that at least a coaxial part of the folded portion extends coaxially along an outer surface of the cylindrical portion, and a bottom formed by bending the end of said cylindrical portion onto an inner diameter side, wherein the bearing is supported and housed by direct contact with an inner cylindrical surface of the cylindrical portion and said cylindrical portion and said folded portion being sandwiched by said stator core and said bearing in a radial direction.

7. A disk drive device comprising:

said disk rotating motor according to claim 6; and a controller that controls the drive state of said disk rotating motor.

* * * * *